Figure 1:
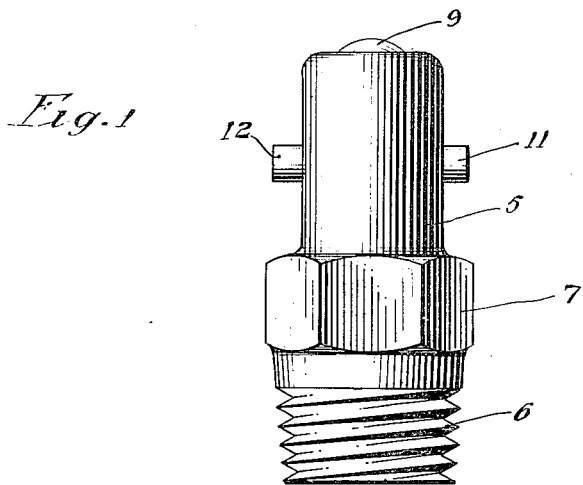

Jan. 1, 1929.  1,697,218

A. C. AHLBERG

NIPPLE

Filed March 26, 1927

Inventor:
Albin C. Ahlberg.

By: Williams, Bradbury,
McCaleb & Hinkle
Atty's.

Patented Jan. 1, 1929.

1,697,218

UNITED STATES PATENT OFFICE.

ALBIN C. AHLBERG, OF CHICAGO, ILLINOIS, ASSIGNOR TO ALEMITE MANUFACTURING CORPORATION, OF CHICAGO, ILLINOIS, A CORPORATION OF DELAWARE.

NIPPLE.

Application filed March 26, 1927. Serial No. 178,733.

My invention relates to lubricant receiving nipples and is more particularly concerned with lubricant receiving nipples adapted to form part of a high pressure lubricating system such as that disclosed in Patent Nos. 1,307,733 and 1,307,734 to Arthur V. Gullborg. Lubricating systems of this type comprise a plurality of valved nipples or fittings adapted to be secured to the bearings of a machine to be lubricated, and a lubricant compressor for supplying lubricant at high pressure and provided with a discharge conduit terminating in a nozzle or coupling member which may be rapidly attached to and detached from the lubricant receiving nipples in succession. The preferred form of interlocking means for attaching the coupling to the lubricant receiving nipples comprises the well known bayonet lock and it is to nipples provided with this type of coupling means that my invention relates.

Lubricant receiving nipples of the type to which my invention relates, are manufactured in great numbers and to facilitate the making thereof by automatic high speed machinery it is desirable to form the body of the nipple from relatively soft material such, for example, as brass. While brass or other similar material is ideally suited for forming the body of the nipple, it is too weak to form a part of the bayonet lock and for this purpose a steel pin is commonly driven through the nipple in order to provide a construction having maximum strength and capable of withstanding the high pressures commonly used in lubricating systems of this kind. With this construction it has heretofore been necessary to confine the spring which forms part of the ball check valve in the end of the nipple, between the pin and the ball valve, thereby making it necessary to use a small spring which is easily damaged by pressing the ball valve too far in, as frequently occurs when the nipple is connected with a valved coupling of the type in which the coupling valve is opened by a pin carried thereon engaging with the ball of the nipple. Furthermore, with this construction of nipple it is impossible for the ordinary user to replace a damaged valve spring.

An object of my invention is to provide a new and improved nipple.

Another object is to provide a lubricant receiving nipple having a pin therethrough for forming part of a bayonet lock and wherein the spring is not confined between the pin and the inlet end of the nipple.

Another object is to provide a nipple in which the spring may be readily replaced.

Another object is to provide a nipple having a larger and more serviceable spring.

Another object is to provide a nipple which may be more easily assembled.

Other objects and advantages will appear as the description proceeds.

In the drawing, Fig. 1 is a side elevation of my new and improved nipple; and

Figure 2:
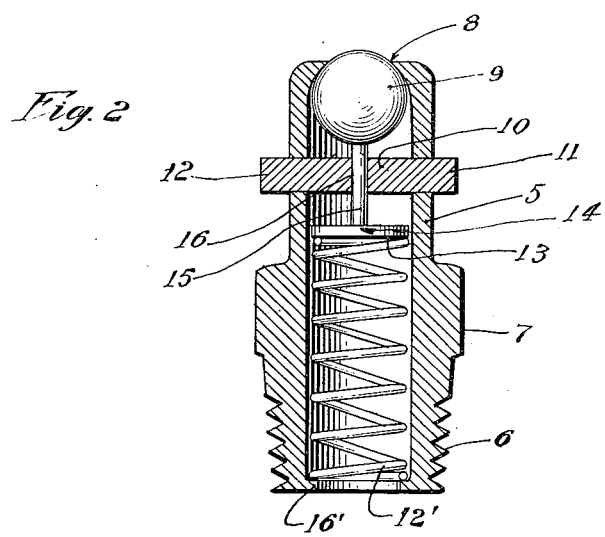

Fig. 2 is a sectional elevation of the same.

Referring to the drawing, my nipple has a tubular body 5, preferably composed of brass or other comparatively soft material and provided with a threaded end 6 whereby the nipple is secured in the end of a passage leading to the bearing to be lubricated. Adjacent the threaded end 6 is a hexagonal part 7 adapted to cooperate with a wrench for screwing the nipple into the end of the passageway leading to the bearing. The other end of the body 5 is provided with an opening 8 forming the inlet to the nipple and normally closed by a ball valve 9.

A pin 10, preferably of steel or similar strong material for resisting the stresses imposed thereon, is driven through the body 5 and provides projecting ends 11 and 12 for interlocking with a slotted coupling attached to the discharge conduit of a lubricant compressor (not shown). A single pin extending entirely through the nipple and projecting from both sides thereof localizes in the pin itself all bending stresses resulting from the pressure of the lubricant on the end of the nipple tending to force said nipple from the coupling and the equal and opposite forces exerted on the end of the pin by the interengaging parts of the coupling member. This construction thus results in a nipple of maximum strength since the relatively soft body of the nipple is subjected to compression only.

The ball 9 is normally maintained on its seat by a spring 12' acting on the head 13 of a member 14 having an extension 15 extending through a bore 16 in the pin 10 and engaging the lower side of the ball 9. The ball 9 is only slightly smaller than the interior diameter of the tubular body 5 and is, therefore, always located substantially along the axis of the body, and the extension 15 is maintained substantially under the center of the ball, thus insuring that the extension 15 will return the ball to its seat instead of the ball being jammed between this extension and the side of the nipple. The spring 12 is retained in the bore of the nipple by the swaged-over part 16'.

My new and improved form of nipple has an advantage in assembling in that the body portion may be inverted and the ball 9 dropped in place, after which the pin 10 may be inserted without the necessity of providing means for confining a spring between the ball and pin as has heretofore been necessary. The bore 16 may be made in the pin either prior to or after its insertion in the body of the nipple. Thereafter the member 14 and the spring 12 may be inserted and the part 16' swaged over to retain them in place.

Having thus illustrated and described the preferred form of my invention, what I claim and desire to secure by United States Letters Patent is:

1. A lubricant receiving nipple comprising a substantially tubular body having inlet and discharge ends, a pin extending through said body and projecting from both sides thereof intermediate said ends, said pin having a bore therethrough, a valve for said inlet, a member having a disc-like head and an extension projection through said bore and contacting with said valve, and a spring confined between said member and the discharge end of said body.

2. In lubricating apparatus of the class described, a lubricant-receiving nipple adapted to form a quick detachable connection with the discharge conduit of a lubricant compressor, comprising a body member having inlet and discharge ends, means adjacent said discharge end for securing the nipple to a part to be lubricated, coupling means extending through said body and transverse to the axis thereof, a valve for said inlet located on one side of said coupling means, a valve spring located on the other side of said coupling means, and means passing through said coupling means for connecting said valve and valve spring.

In witness whereof, I hereunto subscribe my name this 25th day of March, 1927.

ALBIN C. AHLBERG.